Nov. 24, 1964
T. L. BROWN
3,158,273
SIDE SHIFT LOADER
Filed Dec. 26, 1962
3 Sheets-Sheet 2
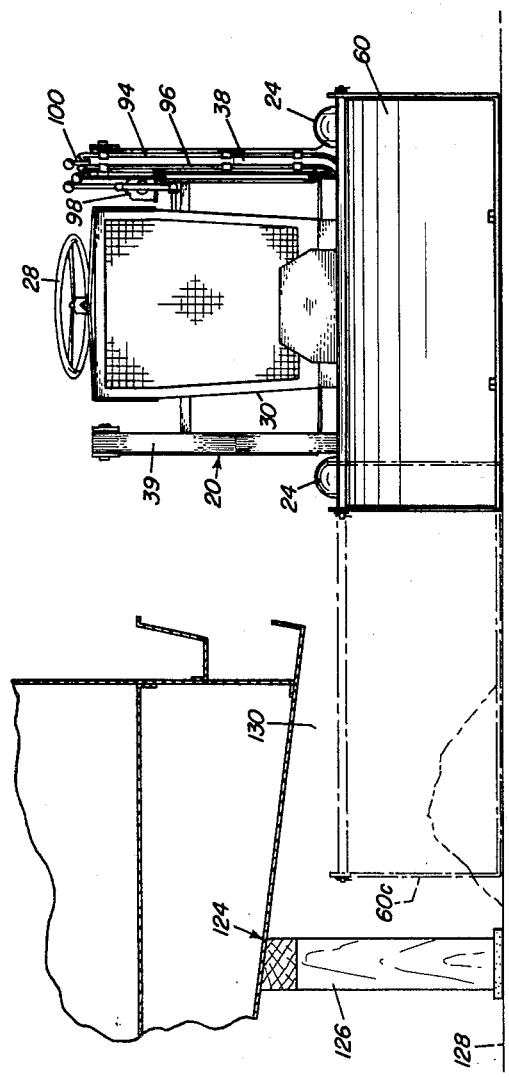
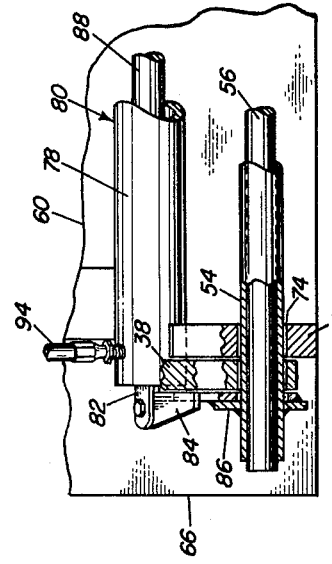
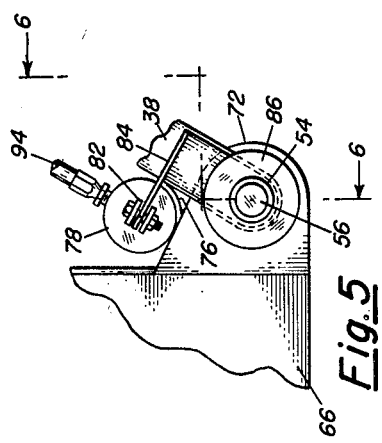
INVENTOR.
THOMAS L. BROWN
BY
ATTORNEYS

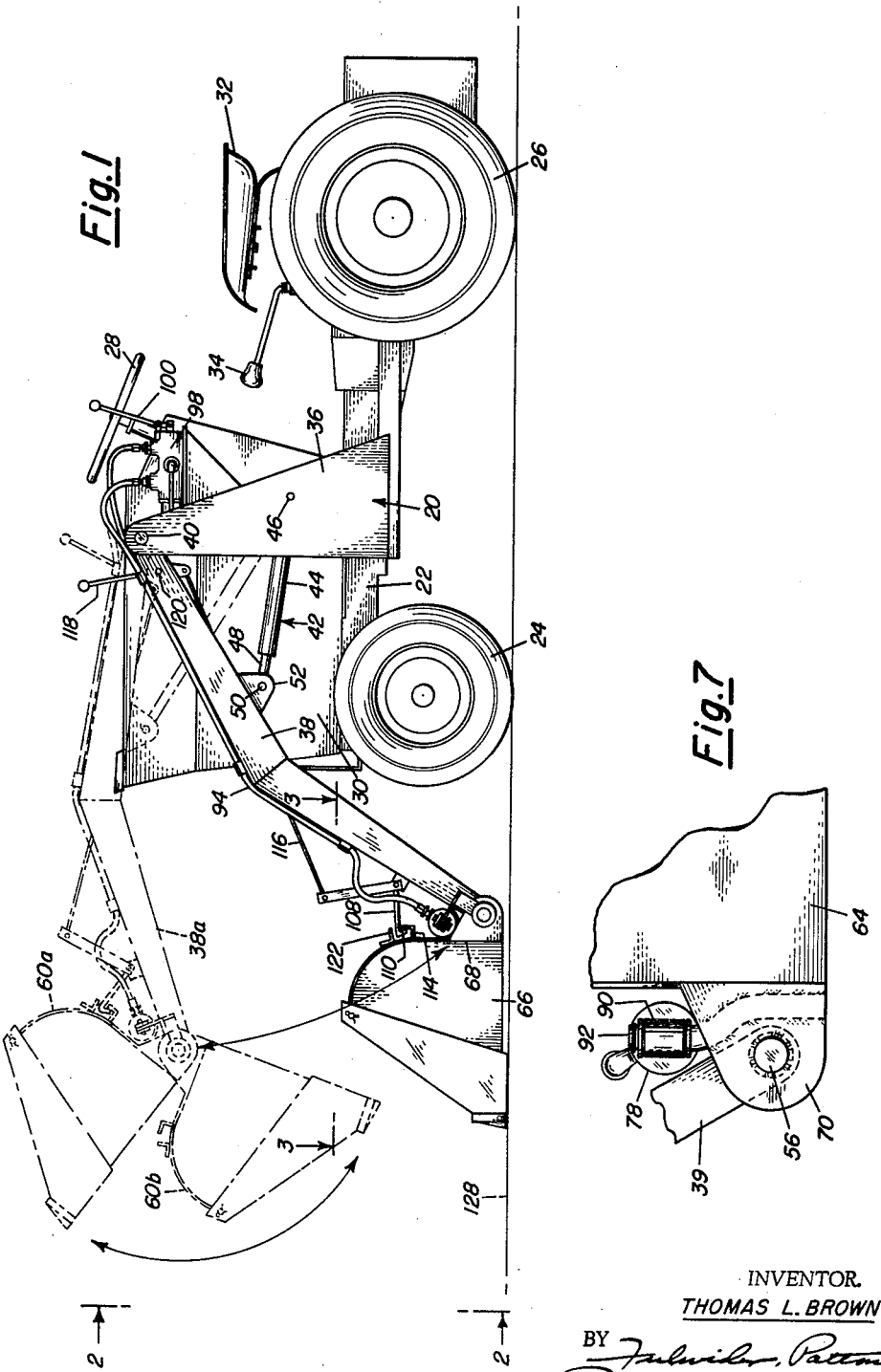

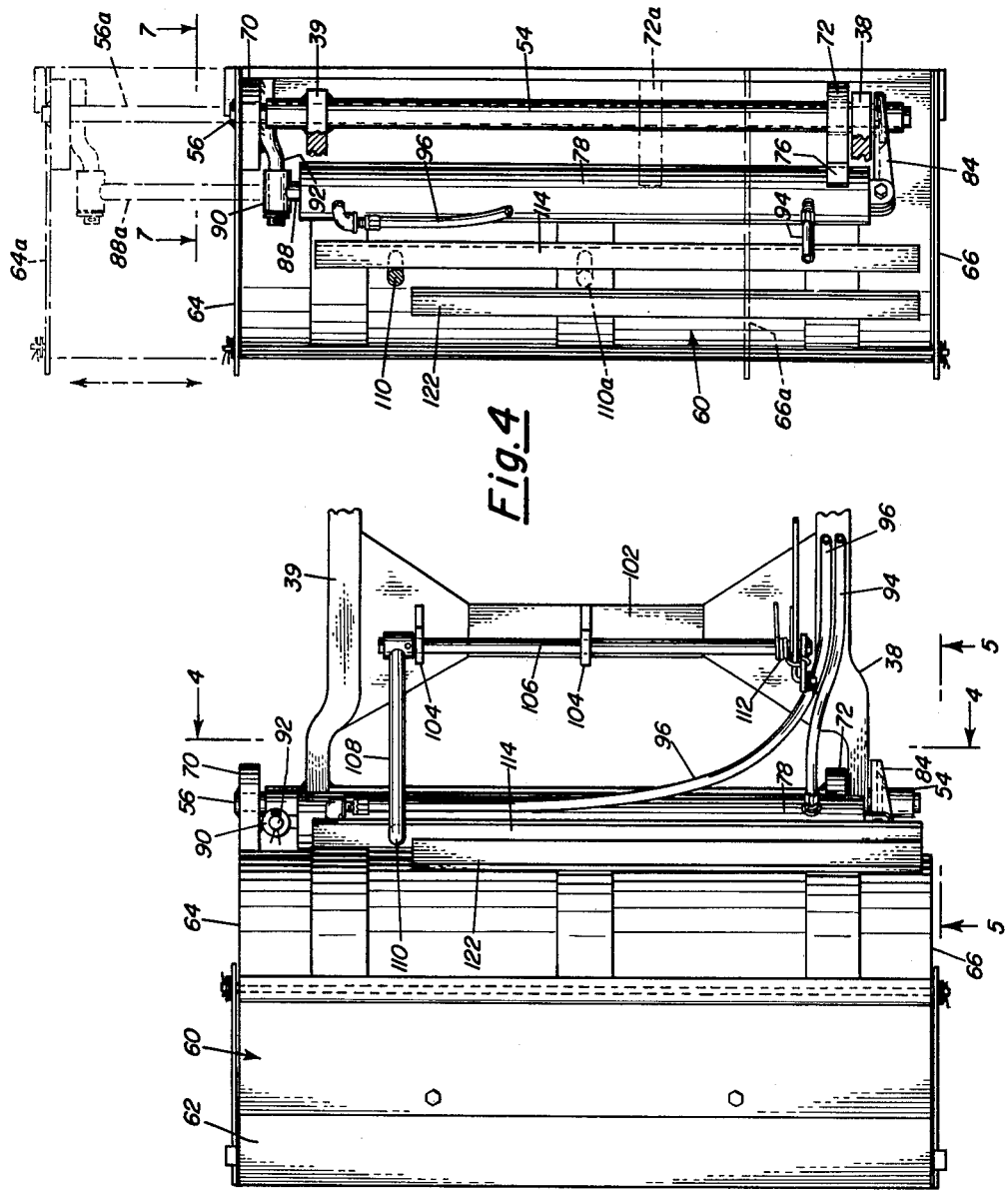

United States Patent Office 3,158,273
Patented Nov. 24, 1964

3,158,273
SIDE SHIFT LOADER
Thomas L. Brown, Lemon Grove, Calif., assignor to Southern Equipment & Supply Co., San Diego, Calif., a corporation of California
Filed Dec. 26, 1962, Ser. No. 247,194
8 Claims. (Cl. 214—140)

The present invention relates to material moving apparatus of the type including a shovel or scoop which is carried by a vehicle and which can be manipulated by the operator of the vehicle. The apparatus of the present invention is generally referred to in the trade as a "front end loader."

The present invention includes a lift arm or pair of lift arms which are carried by the vehicle. These arms carry a shovel or scoop and the arms, together with the scoop, can be lowered so that the scoop can function as such, and can be raised for moving the scooped material to a desired location. By moving the vehicle, with the scoop lowered to ground level, the material can be scooped. Then the arms and vehicle can be moved to dump the scooped material where desired. Such scoops are pivotally mounted about a horizontal axis on the lift arms so that they can be tilted from the scooping position thereof to a position in which the scooped material falls out of the scoop.

The present invention is directed to mechanism for translatably moving the scoop laterally of the arms so that scooping can be accomplished laterally of the arms and the vehicle.

In carrying out the invention, the free ends of the arms carry a horizontally extending bearing which bearing extends laterally of the arm. The scoop is shiftable along the bearing so that it can be disposed laterally of the vehicle.

In the preferred embodiment the bearing, which is carried by the arms, is cylindrical interiorly and exteriorly. A shaft is slidably mounted in the bearing and the scoop is attached thereto and movable therewith. The scoop is also provided with a bearing which cooperates with the exterior of the bearing on the arms for guiding and supporting the scoop.

Other features and advantages of the present invention will be apparent from the following description, reference being had to the accompanying drawings illustrating a preferred form of the invention.

In the drawings:

FIG. 1 is a view in elevation showing the left side of the front end loader, the elevating arm being also shown in a raised position in dot and dash lines, and the scoop being shown in both material holding position and in material dumping position, in dot and dash lines;

FIG. 2 is a front view of the front end loader showing, in elevation, the scoop in retracted position, and showing, in dot and dash lines, the scoop in its extreme laterally disposed position, said view also showing in section a fragmentary view of a poultry cage;

FIG. 3 is a fragmentary top plan view of the front end loader, but on a larger scale than shown in FIGS. 1 and 2;

FIG. 4 is a view looking in the direction of arrows 4—4 of FIG. 3;

FIG. 5 is a fragmentary view looking in the direction of arrows 5—5 of FIG. 3, but on a larger scale;

FIG. 6 is a fragmentary view, partly in section, looking in the direction or arrows 6—6 of FIG. 5 and FIG. 7 is a view looking in the direction of arrows 7—7 of FIG. 4 on a larger scale.

Referring more in detail to the drawings, the front end loader is shown at 20; it includes a main frame 22 which is supported by a pair of front wheels 24 and a pair of rear wheels, one of which latter is shown at 26. The front wheels are suitably steered by the usual steering mechanism through a steering wheel 28. The front end of the frame carries an engine (not shown), but which is housed within the hood 30. The rear of the frame 22 carries a driver's seat 32. Suitable transmission mechanism is interposed between the engine and the rear wheels for imparting movement to the rear wheels. A gear shift lever 34 is provided for controlling the transmission mechanism.

The frame 22 carries two uprights 36 on the right and left sides thereof. These uprights carry lift arms 38 and 39, the arms being pivotally mounted on the uprights 36 through trunnions 40. The arms 38 and 39 are shown in their lowermost position in full lines in FIG. 1. These arms are raised by hydraulic motors 42, each including a cylinder 44 which is pivotally mounted at 46 on an upright and a ram 48 which is pivotally mounted at 50 on a downwardly extending ear 52 on the arm. The arm 38 is shown in a raised position at 38a in dot and dash lines in FIG. 1.

A tube 54 extends transversely, namely at right angles with respect to the lift arms 38 and 39. This tube is suitably secured as by welding to the lower end of arm 39 and is also secured to the lower end of arm 38 in the same manner, but not necessarily so. This tube is circular in cross-section interiorly and exteriorly and carries a shaft 56 which is also circular in cross-section. The scoop 60 includes a bottom wall 62, a right side wall 64, a left side wall 66 and a rear wall 68. The scoop 60 is provided with an ear 70 at the rear and adjacent the bottom and right side. The shaft 56 is welded to this ear. The scoop 60 also includes an ear 72 which is disposed adjacent the bottom and rear thereof and also adjacent the left side of the scoop. This ear 72 is bored as at 74 and is slidably mounted upon the tube 54. The upper end of this ear 72 is arcuate in shape to provide a cradle 76 for the cylinder 78 of a hydraulic motor 80. The cylinder 78 is arranged parallelly of the tube 54 and the shaft 56 and is disposed above the tube 54.

The left end of the cylinder 78 is provided with an ear 82 which is suitably secured to a bracket which encircles the tube 54 to the left of the arm 38. This bracket 84 is held in position by a washer 86 which is welded to the periphery of the tube 54. The hydraulic motor also includes a ram or shaft 88. The right end of the ram 88 is in the form of a vertically extending sleeve 90 which receives a post 92, and this post is suitably welded to the ear 70 of the scoop. The left side of the hydraulic cylinder 78 is in communication with hydraulic fluid through a tube 94 and the right side of the cylinder is in communication with the source of hydraulic fluid through a tube 96.

When fluid is forced into the cylinder 78 through the tube 94 and withdrawn from the cylinder through the tube 96, the ram 88 will move to the right, and, inasmuch as the ram 88 is secured to the ear 70, the scoop 60 will also be moved to the right. The scoop will be guided laterally by the shaft 56 and the tube 54. The cradle 76 will slide along the underside of the cylinder 78 to assist in supporting the same. The scoop is retracted by forcing hydraulic fluid through the tube 96 and at the same time the fluid will be withdrawn from the left side of the cylinder through the tube 94. Suitable valve mechanism 98, controlled by a lever 100, controls the flow of fluid to and from the hydraulic motor.

A brace 102 is interposed between the lift arms 38 and 39. This brace provides bearings 104 for a shaft 106 which is disposed transversely of the arms 38 and 39. This shaft carries a forwardly extending rod 108, the forward end of which is bent downwardly as at 110 to form a hook. The shaft 106 is normally urged in a counter-clockwise direction by a coil spring 112 and thus the hook 110 is in the form of a latch. A channel is formed on the rear wall 68 of the scoop 60 by an angle iron 114. The spring 112 urges the latch 110 into latching engagement with the angle iron 114. This latch can be moved to unlatching position by a rod 116 which is actuated by a lever 118 which is pivotally mounted on the arm 38 by a pin 120. A latch retainer in the form of an angle iron 122 is welded to the rear side 68 of the scoop 60 and lies above the latch 110 when the latch is in latching position. As will be seen from FIGS. 3 and 4, the latch can be released only when the scoop 60 is substantially in its extreme retracted position. As the scoop is moved to the right, the angle iron 122 will overlie the latch 110 and prevent downward movement thereof. In this manner the scoop can be moved from its position shown in full lines in FIG. 1 or the dot and dash line 60a to the dot and dash position 60b only when the scoop is in substantially its extreme left position.

The present invention is particularly useful for removing, for example, manure from below chicken cages. Such cage is shown fragmentarily in FIG. 2 at 124. Such cages include a frame 126 which supports the cage above the ground level indicated at 128. The cage 124 extends to the right of the supporting frame 126 so as to provide a free and open space 130 forming the area where the manure droppings accumulate. Since the scoop can be moved to the left, that is, laterally with respect to the vehicle, as shown in dot and dash lines 60c in FIG. 2, the scoop can be effective throughout the entire area where the droppings accumulated.

In operation, the vehicle 20 is steered to adjacent the side of the cages, with the arms 38 and 39 lowered, whereby the scoop 60 is brought to adjacent the ground level. Then the valve 98 is actuated to cause the scoop to be moved to the left as viewed in FIG. 2. Thereafter, the scoop 60 is lowered to ground level as shown at 60c. Upon forward movement of the vehicle, the scooping takes place. After the scoop is substantially filled, the valve 98 is manipulated to retract the scoop to the position shown in full lines in FIG. 2. The arms 38 and 39 are then raised through the hydraulic motor 42. As previously set forth, the latch retainer 122 will then be in a position in which the latch 110 can be released manually for emptying the scoop 60. The material previously scooped will fall by gravity.

Upon lowering of the lift arms, through the hydraulic motor 42, as is the usual practice, the scoop 60, upon engaging the ground, will move clockwise, as viewed in FIG. 1 and when angle iron 114 engages the front of the latch 110, the latter will be cammed upwardly and then moved downwardly by the spring 112 into latching position.

While the form of embodiment herein shown and described, constitutes preferred form, it is to be understood that other forms may be adopted falling within the scope of the claims that follow.

I claim:
1. Material removing apparatus, comprising in combination:
 (A) a vehicle;
 (B) supporting means carried by the vehicle;
 (C) a forwardly extending arm;
 (D) means on the supporting means for supporting said arm for pivotal movement about a horizontally extending axis;
 (E) means for raising and lowering the arm;
 (F) a scoop;
 (G) means pivotally carrying said scoop on the free end of the arm for swinging movement about a horizontally extending axis and for translatably moving said scoop horizontally relative to said arm;
 (H) means for oscillating said scoop about said pivotal means;
 (I) and means for translatably shifting said scoop at right angles relative to said arm and to one side of the front of the vehicle.

2. Material removing apparatus, comprising in combination:
 (A) a vehicle;
 (B) supporting means carried by the vehicle;
 (C) a forwardly extending arm;
 (D) means on the supporting means for supporting said arm for pivotal movement about a horizontally extending axis;
 (E) means for raising and lowering the arm;
 (F) a scoop;
 (G) an elongated and horizontally extending bearing;
 (H) means supporting said bearing substantially at right angles with respect to the arm;
 (I) means for supporting the scoop by said bearing;
 (J) means for shifting said scoop supporting means with a scoop along said bearing to one side of the front of the vehicle;
 (K) and means for oscillating the scoop about the scoop supporting means.

3. Material removing apparatus, comprising in combination:
 (A) a vehicle;
 (B) supporting means carried by the vehicle;
 (C) a forwardly extending arm;
 (D) means on the supporting means for supporting said arm for pivotal movement about a horizontally extending axis;
 (E) means for raising and lowering the arm;
 (F) a scoop;
 (G) a horizontally extending cylindrical bearing;
 (H) means supporting said bearing substantially at right angles with respect to the arm;
 (I) a shaft horizontally slidable and oscillatable in said bearing;
 (J) means connecting said shaft with the scoop;
 (K) means for shifting said shaft with the scoop along said bearing to one side of the front of the vehicle;
 (L) and means for oscillating the shaft and scoop about said bearing.

4. Material removing apparatus, comprising in combination:
 (A) a vehicle;
 (B) supporting means carried by the vehicle;
 (C) a forwardly extending arm;
 (D) means on the supporting means for supporting said arm for pivotal movement about a horizontally extending axis;
 (E) means for raising and lowering the arm;
 (F) a scoop;
 (G) a horizontally extending bearing, said bearing being circular in cross-section interiorly and exteriorly;
 (H) means supporting said bearing substantially at right angles with respect to the arm;
 (I) a shaft horizontally slidable and oscillatable in said bearing;
 (J) means connecting said shaft with the scoop;
 (K) a bearing on the scoop surrounding the first mentioned bearing and guided thereby;
 (L) means for shifting said shaft with the scoop along said first mentioned bearing to one side of the front of the vehicle;
 (M) and means for oscillating the shaft and scoop about said first mentioned bearing.

5. Material removing apparatus as defined in claim 1, characterized in that the means (I) for translatably shifting the scoop includes:
 (I1) a hydraulic motor carried by the arm.

6. Material removing apparatus as defined in claim 1 characterized in that the means (I) for translatably shifting the scoop includes:
 (I1) a hydraulic motor, said motor including:
  (a) a cylinder attached to the arm;

(b) and a cooperating ram attached to the scoop.

7. Material removing apparatus as defined in claim 3 characterized in that said shaft comprises: a hydraulic ram; and the means (K) for shifting the shaft includes:

(K1) a hydraulic cylinder carried by said arm.

8. Material removing apparatus as defined in claim 4 characterized in that said shaft comprises: a hydraulic ram, and means (L) for shifting the shaft includes:

(L1) a hydraulic cylinder carried by said arm.

References Cited in the file of this patent
UNITED STATES PATENTS

| | | |
|---|---|---|
| 2,326,197 | Blecha | Aug. 10, 1943 |
| 2,341,007 | Wommer | Feb. 8, 1944 |
| 2,815,591 | Mattingly | Dec. 10, 1957 |
| 2,820,562 | Schenkelberger | Jan. 21, 1958 |
| 2,822,101 | Schenkelberger | Feb. 4, 1958 |
| 2,887,236 | Mindrum | May 19, 1959 |